US012673688B2

(12) United States Patent
Wang et al.

(10) Patent No.: US 12,673,688 B2
(45) Date of Patent: Jul. 7, 2026

(54) DRIVER ASSISTANCE METHOD AND APPARATUS, DEVICE AND STORAGE MEDIUM

(71) Applicant: UISEE (SHANGHAI) AUTOMOTIVE TECHNOLOGIES LTD., Shanghai (CN)

(72) Inventors: Zihan Wang, Shanghai (CN); Lingxia Ye, Shanghai (CN); Yang Liu, Shanghai (CN)

(73) Assignee: UISEE (SHANGHAI) AUTOMOTIVE TECHNOLOGIES LTD., Shanghai (CN)

( * ) Notice: Subject to any disclaimer, the term of this patent is extended or adjusted under 35 U.S.C. 154(b) by 217 days.

(21) Appl. No.: 18/579,347

(22) PCT Filed: Jul. 8, 2022

(86) PCT No.: PCT/CN2022/104500
§ 371 (c)(1),
(2) Date: Jan. 13, 2024

(87) PCT Pub. No.: WO2023/005638
PCT Pub. Date: Feb. 2, 2023

(65) Prior Publication Data
US 2024/0375668 A1　　Nov. 14, 2024

(30) Foreign Application Priority Data
Jul. 30, 2021　(CN) .......................... 202110872851.5

(51) Int. Cl.
*B60W 50/00*　(2006.01)
*B60W 50/02*　(2012.01)
*B60W 50/029*　(2012.01)

(52) U.S. Cl.
CPC ...... *B60W 50/029* (2013.01); *B60W 50/0205* (2013.01); *B60W 2050/0215* (2013.01); *B60W 2050/022* (2013.01)

(58) Field of Classification Search
CPC ........... B60W 50/029; B60W 50/0205; B60W 2050/0215; B60W 2050/022; B60W 2050/0292; B60W 50/0225
See application file for complete search history.

(56) References Cited

U.S. PATENT DOCUMENTS 7,672,756 B2 * 3/2010 Breed .................... G07C 5/008
　　　　　　　　　　　　　　　　　　　　　 701/1
11,204,609 B1 * 12/2021 Ng ............................ H02P 7/29
(Continued)

FOREIGN PATENT DOCUMENTS

CN　　　109606385　　　4/2019
CN　　　110077420　　　8/2019
(Continued)

OTHER PUBLICATIONS

English Translation in view of CN 113085881 (Year: 2021).*
(Continued)

*Primary Examiner* — Ian Jen
(74) *Attorney, Agent, or Firm* — Wissing Miller LLP

(57) ABSTRACT

Provided are a driver-assistance method and apparatus, a device and a storage medium. The method includes that: diagnosis information of multiple sensors of a target vehicle, diagnosis information of multiple actuators of the target vehicle, and diagnosis information of multiple modular software functions are acquired in real time; a failure condition of a driver-assistance function of the target vehicle is determined according to the diagnosis information of the multiple sensors, the diagnosis information of the multiple actuators, and the diagnosis information of the multiple modular software functions; and a driver-assistance strategy
(Continued)

Acquire diagnosis information of multiple sensors of a target vehicle, diagnosis information of multiple actuators of the target vehicle, and diagnosis information of multiple modular software functions in real time　S110

Determine a failure condition of a driver-assistance function of the target vehicle according to the diagnosis information of the multiple sensors, the diagnosis information of the multiple actuators, and the diagnosis information of the multiple modular software functions　S120

Determine a driver-assistance strategy of the target vehicle according to the failure condition of the driver-assistance function of the target vehicle, and continue to assist in driving the target vehicle according to the driver-assistance strategy　S130 of the target vehicle is determined according to the failure condition of the driver-assistance function of the target vehicle, and the target vehicle is continued to be assisted in driving according to the driver-assistance strategy.

16 Claims, 8 Drawing Sheets

(56) References Cited

U.S. PATENT DOCUMENTS

| | | | |
|---|---|---|---|
| 2007/0005202 A1* | 1/2007 | Breed | G07C 5/008 |
| | | | 714/25 |
| 2020/0017114 A1* | 1/2020 | Santoni | B60W 50/023 |
| 2020/0031297 A1* | 1/2020 | Foltin | B60W 50/029 |
| 2020/0201323 A1 | 6/2020 | Park | |
| 2020/0209848 A1 | 7/2020 | Mercep | |
| 2021/0163021 A1* | 6/2021 | Frazzoli | B60W 50/023 |
| 2021/0223780 A1 | 7/2021 | Bramley | |
| 2022/0289044 A1* | 9/2022 | Downs, Jr. | B60L 15/36 |
| 2023/0071271 A1* | 3/2023 | Chelminski | B60W 50/0097 |
| 2023/0112004 A1* | 4/2023 | Hari | B60W 60/0015 |
| | | | 701/23 |
| 2023/0192139 A1* | 6/2023 | Kumavat | B60W 50/0098 |
| | | | 701/25 |

FOREIGN PATENT DOCUMENTS

| | | |
|---|---|---|
| CN | 110446222 | 11/2019 |
| CN | 111824173 | 10/2020 |
| CN | 112977479 | 6/2021 |
| CN | 113085881 | 7/2021 |
| CN | 113093591 | 7/2021 |
| CN | 113415290 | 9/2021 |
| JP | 2013071549 | 4/2013 |
| JP | 2019038421 | 3/2019 |
| JP | 2019144758 | 8/2019 |
| JP | 2019185246 | 10/2019 |
| WO | 2017079321 | 5/2017 |
| WO | 2021037957 | 3/2021 |

OTHER PUBLICATIONS

English Translation in view of CN110077420 (Year: 2019).*
International Search Report mailed PCT/CN2022/104500 on Sep. 6, 2022 (5 pages).

* cited by examiner

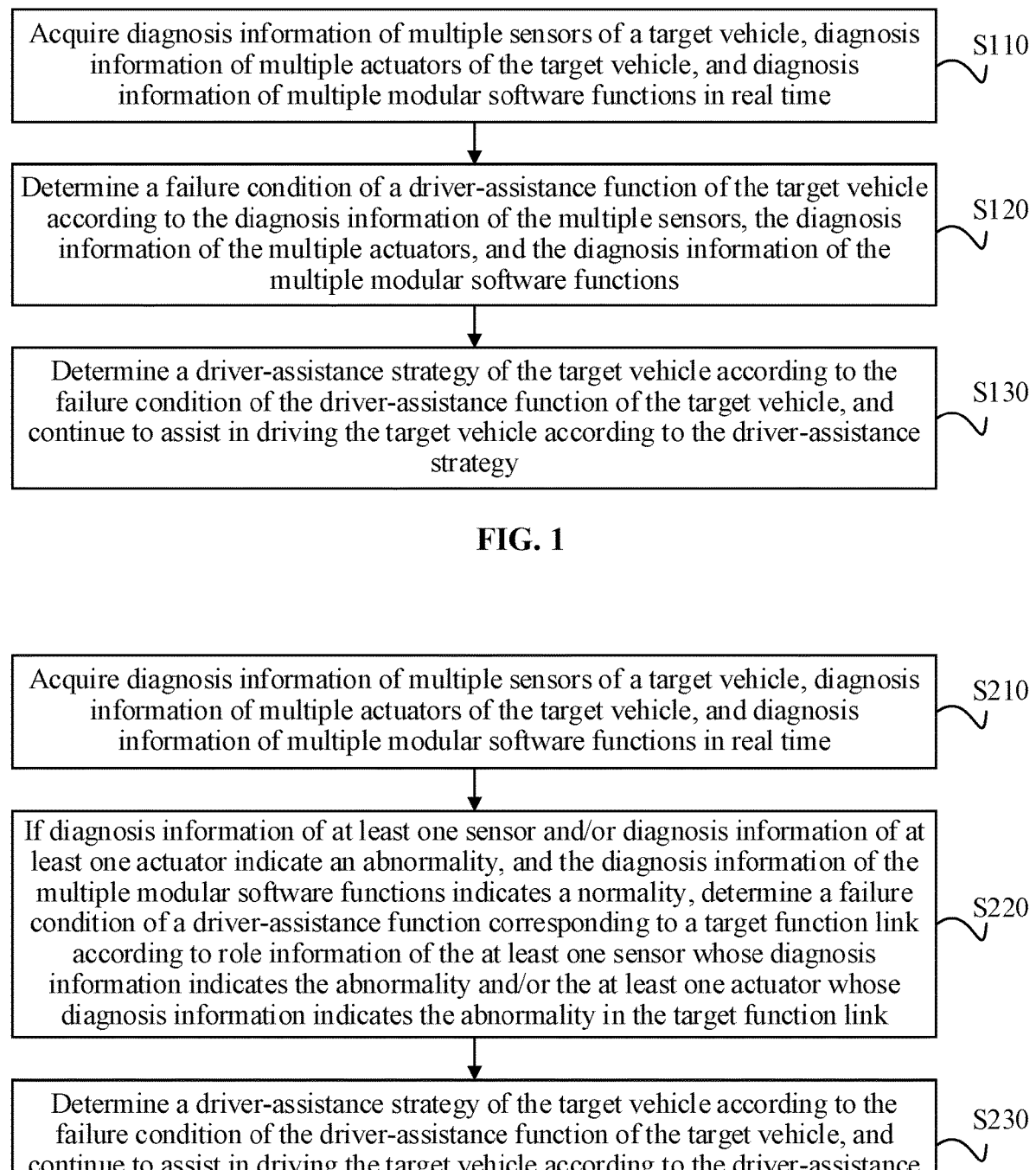

Acquire diagnosis information of multiple sensors of a target vehicle, diagnosis information of multiple actuators of the target vehicle, and diagnosis information of multiple modular software functions in real time ⟶ S110

Determine a failure condition of a driver-assistance function of the target vehicle according to the diagnosis information of the multiple sensors, the diagnosis information of the multiple actuators, and the diagnosis information of the multiple modular software functions ⟶ S120

Determine a driver-assistance strategy of the target vehicle according to the failure condition of the driver-assistance function of the target vehicle, and continue to assist in driving the target vehicle according to the driver-assistance strategy ⟶ S130

FIG. 1

Acquire diagnosis information of multiple sensors of a target vehicle, diagnosis information of multiple actuators of the target vehicle, and diagnosis information of multiple modular software functions in real time ⟶ S210

If diagnosis information of at least one sensor and/or diagnosis information of at least one actuator indicate an abnormality, and the diagnosis information of the multiple modular software functions indicates a normality, determine a failure condition of a driver-assistance function corresponding to a target function link according to role information of the at least one sensor whose diagnosis information indicates the abnormality and/or the at least one actuator whose diagnosis information indicates the abnormality in the target function link ⟶ S220

Determine a driver-assistance strategy of the target vehicle according to the failure condition of the driver-assistance function of the target vehicle, and continue to assist in driving the target vehicle according to the driver-assistance strategy ⟶ S230

FIG. 2

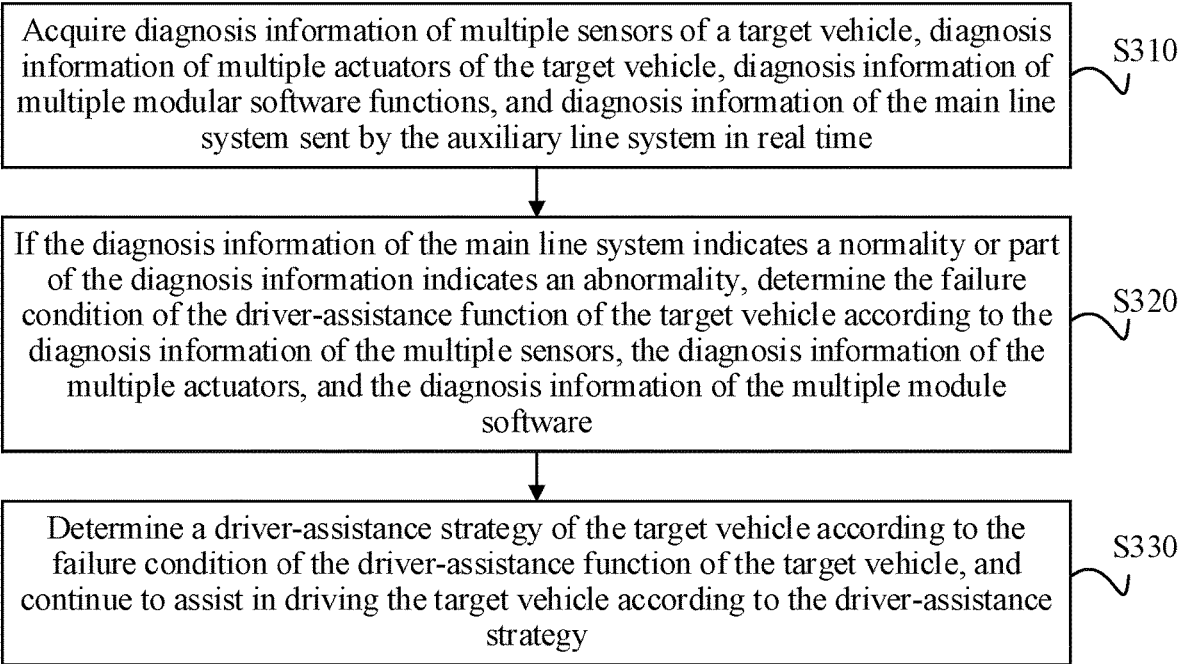

| Acquire diagnosis information of multiple sensors of a target vehicle, diagnosis information of multiple actuators of the target vehicle, diagnosis information of multiple modular software functions, and diagnosis information of the main line system sent by the auxiliary line system in real time | S310 |

| If the diagnosis information of the main line system indicates a normality or part of the diagnosis information indicates an abnormality, determine the failure condition of the driver-assistance function of the target vehicle according to the diagnosis information of the multiple sensors, the diagnosis information of the multiple actuators, and the diagnosis information of the multiple module software | S320 |

| Determine a driver-assistance strategy of the target vehicle according to the failure condition of the driver-assistance function of the target vehicle, and continue to assist in driving the target vehicle according to the driver-assistance strategy | S330 |

FIG. 5

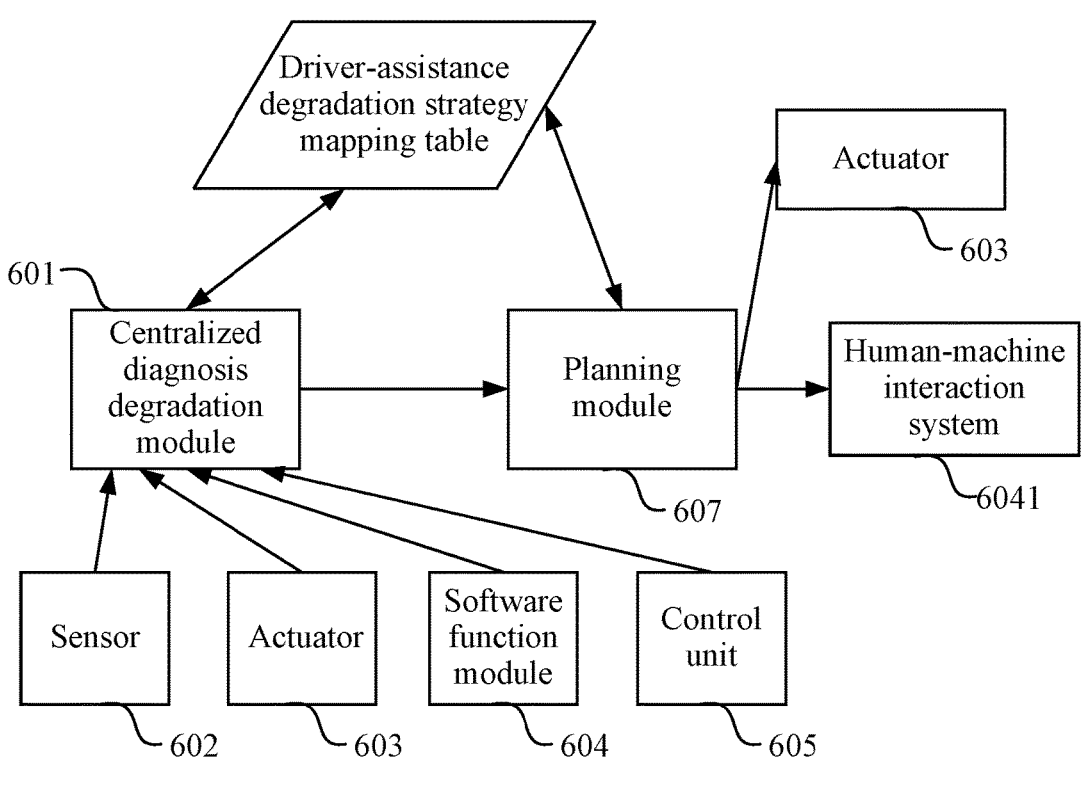

FIG. 6

| Num | Degrade Level | Fail Source | Front Sensor: Mobileye Camera | LRR | AI Camera | USS | LFSRR | RFSRR | Left Side: USS | LFSRR | LRSRR | Right Side: USS | RFSRR | RRSRR | Rear: USS | LRSRR | RRSRR | GPS | EPS | ECM | EBCM | HMI | L3 | Fusion | ACC | AEB | FCA | LC | DCLC | APA | SBZ | ALocation |
|---|---|---|---|---|---|---|---|---|---|---|---|---|---|---|---|---|---|---|---|---|---|---|---|---|---|---|---|---|---|---|---|---|
| 1 | 0 | No Error | No Error | No Error | No Error | No Error | No Error | No Error | No Error | No Error | No Error | No Error | No Error | No Error | No Error | No Error | No Error | No Error | No Error | No Error | No Error | No Error | No Error | No Error | No Error | No Error | No Error | No Error | No Error | No Error | No Error | No Error |
| 2 | 1 | GPS Error | OK | OK | OK | OK | OK | OK | OK | OK | OK | OK | OK | OK | OK | OK | OK | Error | OK | OK | OK | OK | Error | OK | OK | OK | OK | OK | OK | OK | OK | Failed |
| 3 | 1 | USS Error | OK | OK | OK | Error | OK | OK | Error | OK | OK | Error | OK | OK | Error | OK | OK | OK | OK | OK | OK | OK | OK | OK | OK | OK | OK | OK | Failed | Failed | OK | OK |
| 4 | 1 | ME Camera | Error | OK | OK | OK | OK | OK | OK | OK | OK | OK | OK | OK | OK | OK | OK | OK | OK | OK | OK | OK | OK | Degrd | Degrd | Degrd | Degrd | Degrd (1) | Failed | OK | OK | Degrd |
| 5 | 1 | LRR | OK | Error | OK | OK | OK | OK | OK | OK | OK | OK | OK | OK | OK | OK | OK | OK | OK | OK | OK | OK | Inavailable | Degrd | Degrd | Degrd | Degrd | OK | OK | OK | OK | Degrd |
| 6 | 2 | AI Camera | OK | OK | Error | OK | OK | OK | OK | OK | OK | OK | OK | OK | OK | OK | OK | OK | OK | OK | OK | OK | Inavailable | Degrd | Degrd | OK | Degrd | OK | OK | OK | OK | OK |
| 7 | 2 | Front SRR | OK | OK | OK | OK | Error | Error | OK | Error | OK | OK | Error | OK | OK | OK | OK | OK | OK | OK | OK | OK | Inavailable | Degrd | OK | OK | OK | OK | OK | OK | OK | OK |
| 8 | 2 | | OK | OK | OK | OK | OK | OK | OK | OK | Error | OK | OK | OK | OK | OK | OK | OK | OK | OK | OK | OK | Inavailable | Degrd | OK | OK | OK | OK | OK | OK | OK | OK |
| 9 | 2 | Rear SRR | OK | OK | OK | OK | OK | OK | OK | OK | OK | OK | Error | OK | OK | Error | OK | OK | OK | OK | OK | OK | Inavailable | Degrd | OK | OK | OK | OK | Failed | Failed | Failed | OK |
| 10 | 2 | | OK | OK | OK | OK | OK | OK | OK | OK | OK | OK | OK | Error | OK | OK | Error | OK | OK | OK | OK | OK | Inavailable | Degrd | OK | OK | OK | OK | Failed | Failed | Failed | OK |
| 11 | 2 | A+ME | Error | OK | Error | OK | OK | OK | OK | OK | OK | OK | OK | OK | OK | OK | OK | OK | OK | OK | OK | OK | Inavailable | Degrd | Degrd | Degrd | Degrd | Degrd (2) | Failed | OK | OK | Failed |
| 12 | 2 | ME+LRR | Error | Error | OK | OK | OK | OK | OK | OK | OK | OK | OK | OK | OK | OK | OK | OK | OK | OK | OK | OK | Inavailable | Degrd | Degrd | Failed | Degrd | Degrd (3) | Failed | OK | OK | Degrd |
| 13 | 2 | A+LRR | OK | Error | Error | OK | OK | OK | OK | OK | OK | OK | OK | OK | OK | OK | OK | OK | OK | OK | OK | OK | Inavailable | Degrd | Degrd | Degrd | Degrd | Degrd (4) | OK | OK | OK | OK |
| 14 | 2 | LFSRR+RFSRR | OK | OK | OK | OK | Error | Error | OK | OK | OK | OK | OK | OK | OK | OK | OK | OK | OK | OK | OK | OK | Inavailable | Degrd | OK | OK | OK | OK | OK | OK | OK | OK |
| 15 | 3 | A+ME+LRR | Error | Error | Error | OK | OK | OK | OK | OK | OK | OK | OK | OK | OK | OK | OK | OK | OK | OK | OK | OK | Inavailable | Degrd | Failed | Failed | Failed | Failed | Failed | OK | OK | Failed |
| 16 | 4 | EPS | OK | OK | OK | OK | OK | OK | OK | OK | OK | OK | OK | OK | OK | OK | OK | OK | Error | OK | OK | OK | Inavailable | OK | OK | OK | OK | Failed | Failed | OK | OK | OK |
| 17 | 5 | ECM | OK | OK | OK | OK | OK | OK | OK | OK | OK | OK | OK | OK | OK | OK | OK | OK | OK | Error | OK | OK | Inavailable | OK | Error | OK | OK | Failed | OK | OK | OK | OK |
| 18 | 6 | EBCM | OK | OK | OK | OK | OK | OK | OK | OK | OK | OK | OK | OK | OK | OK | OK | OK | OK | OK | Error | OK | Inavailable | OK | OK | Error | OK | OK | OK | OK | OK | OK |
| 19 | 7 | HMI | OK | OK | OK | OK | OK | OK | OK | OK | OK | OK | OK | OK | OK | OK | OK | OK | OK | OK | OK | Error | Inavailable | Degrd | Degrd | Degrd | Degrd | Degrd | Failed | Degrd | OK | OK |

DRIVER ASSISTANCE METHOD AND APPARATUS, DEVICE AND STORAGE MEDIUM

CROSS-REFERENCES TO RELATED APPLICATIONS

This is a National Stage Application, filed under 35 U.S.C. 371, of International Patent Application No. PCT/CN2022/104500, filed on Jul. 8, 2022, which is based on and claims priority to Chinese Patent Application No. 202110872851.5, filed with the China National Intellectual Property Administration (CNIPA) on Jul. 30, 2021, the disclosure of each is incorporated herein in their entirety by reference.

TECHNICAL FIELD

Embodiments of the present application relate to the technical field of automobile driving, for example, to a driver-assistance method and apparatus, a device, and a storage medium.

BACKGROUND

With the advancement of science and technology, an installed amount of driver-assistance systems in the automobiles is rapidly increased. For a multi-sensor multi-function driver-assistance system, each function module has an independent diagnosis function. When any sensor in the driver-assistance system fails, the driver-assistance function may be quitted immediately so as to reduce the responsibility of the whole vehicle factory, thereby causing the problem of low stability of the driver-assistance system.

SUMMARY

Embodiments of the present application provide a driver-assistance method and apparatus, a device, and a storage medium, so as to improve the stability and the fault tolerance of a driver-assistance system.

An embodiment of the present application provides a driver-assistance method. The method includes that: diagnosis information of multiple sensors of a target vehicle, diagnosis information of multiple actuators of the target vehicle, and diagnosis information of multiple modular software functions are acquired in real time; a failure condition of a driver-assistance function of the target vehicle is determined according to the diagnosis information of the multiple sensors, the diagnosis information of the multiple actuators, and the diagnosis information of the multiple modular software functions; and a driver-assistance strategy of the target vehicle is determined according to the failure condition of the driver-assistance function of the target vehicle, and the target vehicle is continued to be assisted in driving according to the driver-assistance strategy.

An embodiment of the present application further provides a driver-assistance apparatus. The apparatus includes a diagnosis information acquisition module, a driver-assistance function failure analysis module and a driver-assistance control module. The diagnosis information acquisition module is configured to acquire, in real time, diagnosis information of multiple sensors of a target vehicle, diagnosis information of multiple actuators of the target vehicle, and diagnosis information of multiple modular software functions. The driver-assistance function failure analysis module is configured to determine a failure condition of a driver-assistance function of the target vehicle according to the diagnosis information of the multiple sensors, the diagnosis information of the multiple actuators, and the diagnosis information of the multiple modular software functions. The driver-assistance control module is configured to determine a driver-assistance strategy of the target vehicle according to the failure condition of the driver-assistance function of the target vehicle, and continue to assist in driving the target vehicle according to the driver-assistance strategy.

An embodiment of the present application further provides a vehicular device. The vehicular device includes at least one processor and a memory. The memory is configured to store at least one program. The at least one program, when executed by the at least one processor, causes the at least one processor to implement the method described in any one of the embodiments of the present application.

An embodiment of the present application further provides a computer-readable storage medium storing a computer program. The program, when executed by a processor, implements the method described in any one of the embodiments of the present application.

BRIEF DESCRIPTION OF DRAWINGS

FIG. 1 is a flowchart of a driver-assistance method according to an embodiment one of the present application;

FIG. 2 is a flowchart of a driver-assistance method according to an embodiment two of the present application;

FIG. 5 is a flowchart of a driver-assistance method according to an embodiment three of the present application;

FIG. 6 is a schematic diagram of a module architecture for which a driver-assistance method is suitable according to an embodiment four of the present application is applicable;

FIG. 9 is an example diagram of a driver-assistance degradation strategy mapping table according to an embodiment four of the present application;

DETAILED DESCRIPTION

Figure 3:
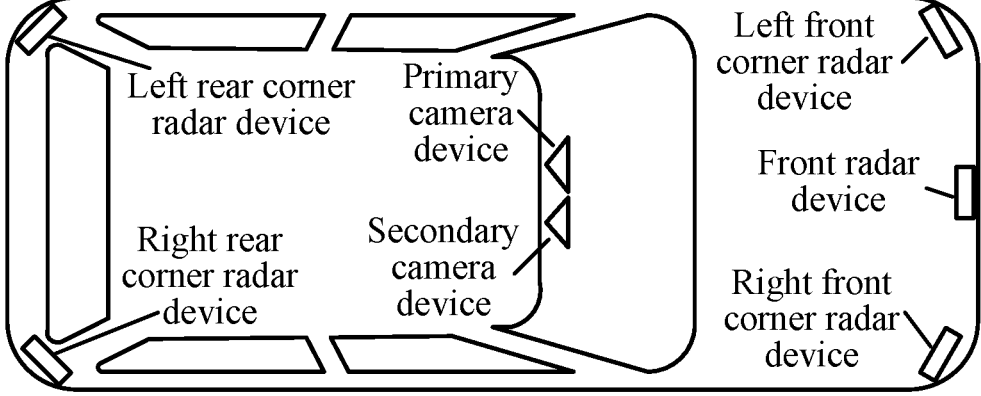
FIG. 3 is a schematic diagram of an installation of a device of a vehicle according to an embodiment two of the present application.

The present application is described below in conjunction with drawings and embodiments. It should be understood that embodiments described herein are merely intended to explain the present application and not to limit the present application. Additionally, it should also be noted that for ease of description, only the structures of the parts related to the present application are shown in the drawings.

Embodiment One

FIG. 1 is a flowchart of a driver-assistance method according to an embodiment one of the present application.

This embodiment may be applied to a scenario in which a vehicle equipped with an advanced driver-assistance system performs a driver-assistance function. For example, this scenario may be a case where a vehicle equipped with an Level 3 driver-assistance system performs a driver-assistance function. The method may be performed by a driver-assistance apparatus, and the apparatus may be implemented in hardware and/or software, and may be generally integrated in a vehicular device.

As shown in FIG. 1, the driver-assistance method provided in this embodiment includes the following steps.

In S110, diagnosis information of multiple sensors of a target vehicle, diagnosis information of multiple actuators of the target vehicle, and diagnosis information of multiple modular software functions are acquired in real time.

The target vehicle refers to any vehicle equipped with a driver-assistance system, such as any vehicle equipped with the advanced driver-assistance system, and may be any vehicle equipped with the Level 3 driver-assistance system.

In this embodiment, the sensor refers to a sensor device involved in the driver-assistance system, and may be, for example, a camera, a radar (including a short-range radar, an electronic scanning radar, and the like), a global positioning system (GPS), an ultrasonic sensor, and the like. The actuator refers to an actuator device involved in the driver-assistance system, and may be, for example, a brake, an engine, an inertial measurement unit, a corner sensor, an electric power steering control unit, a vehicle body controller, a man-machine interface, and the like. The modular software functions refer to function modules at a software level involved in the driver-assistance system, and may be, for example, an adaptive cruise software function module, a lane keeping software function module, a front collision emergency brake function, a longitudinal control software function module, a lateral control software function module, an automatic lane change software function module, a planning positioning software function module (including a map positioning software function module, a non-hardware planning function, and the like), and the like.

For each sensor, each actuator, and each modular software function, an independent diagnosis may be performed, and further the diagnosis information of the multiple sensors, the diagnosis information of the multiple actuators, and the diagnosis information of the multiple modular software functions may be acquired in real time.

Optionally, a fusion module may be disposed in the driver-assistance system, the fusion module is configured to diagnose the multiple sensors respectively according to sensing signals of the multiple sensors so as to generate the diagnosis information of the multiple sensors, the diagnosis information of the multiple actuators, and the diagnosis information of the multiple modular software functions. The diagnosis information of the multiple actuators may be determined based on self-test signals of the multiple actuators, respectively. The diagnosis information of the multiple modular software functions may be determined based on self-test functions of the multiple modular software functions, respectively.

In S120, a failure condition of a driver-assistance function of the target vehicle is determined according to the diagnosis information of the multiple sensors, the diagnosis information of the multiple actuators, and the diagnosis information of the multiple modular software functions.

The failure condition of the driver-assistance function of the target vehicle is analyzed by integrating the diagnosis information of the multiple sensors, the diagnosis information of the multiple actuators, and the diagnosis information of the multiple modular software functions.

The driver-assistance function of the target vehicle refers to any one of driver-assistance functions involved in the driver-assistance system, and may be, for example, an adaptive cruise function, a lane keeping function, a longitudinal control function, a lateral control function, an automatic lane change function, and the like.

Optionally, a failure condition of an assistance function of the target vehicle may include: which of driver-assistance functions are valid, which of driver-assistance functions are invalid, and whether the valid driver-assistance functions are all valid or partially valid, and the like.

As an optional embodiment, the determining the failure condition of the driver-assistance function of the target vehicle according to the diagnosis information of the multiple sensors, the diagnosis information of the multiple actuators, and the diagnosis information of the multiple modular software functions may include: determining that the driver-assistance function corresponding to the at least one modular software function fails in a case where the diagnosis information of the at least one modular software function indicates an abnormality.

After the diagnosis information of the multiple modular software functions is acquired, if a modular software function in which the diagnosis information indicates an abnormality exists, then the driver-assistance function corresponding to the software function module fails. For example, if diagnosis information of the lateral control software function module indicates an abnormality, then a corresponding lateral control function fails.

In S130, a driver-assistance strategy of the target vehicle is determined according to the failure condition of the driver-assistance function of the target vehicle, and the target vehicle is continued to be assisted in driving according to the driver-assistance strategy.

After the failure condition of the driver-assistance function of the target vehicle is determined, a matching driver-assistance strategy may be selected based on a failure condition of a current driver-assistance function, and the target vehicle is continued to be assisted in driving according to the corresponding driver-assistance strategy, instead of exiting the driver-assistance system.

A driver-assistance strategy matched with the failure condition of the current driver-assistance function is a driver-assistance strategy after a part of driver-assistance functions fails on the basis of the original driver-assistance function of the driver-assistance system. That is, the driver-assistance strategy matched with the failure condition of the current driver-assistance function is determined by degradation on the basis of the original driver-assistance strategy of the driver-assistance system.

Optionally, a driver-assistance strategy mapping table may be established in advance based on multiple failure conditions of the driver-assistance function. After the failure condition of the driver-assistance function of the target vehicle is determined, the driver-assistance strategy mapping table is queried according to the failure condition of the driver-assistance function of the target vehicle, so as to determine a driver-assistance strategy matched with the failure condition of the driver-assistance function of the target vehicle, and further continue to assist in driving the target vehicle according to the determined driver-assistance strategy by querying.

As an optional embodiment, the determining the driver-assistance strategy of the target vehicle according to the failure condition of the driver-assistance function of the target vehicle includes: querying a preset driver-assistance degradation strategy mapping table according to the failure condition of the driver-assistance function of the target vehicle to determine a driver-assistance degradation level matched with the failure condition of the driver-assistance function; and querying the driver-assistance degradation strategy mapping table according to the driver-assistance degradation level to determine a driver-assistance strategy matched with the driver-assistance degradation level.

In this embodiment, the driver-assistance degradation strategy mapping table is established in advance. The driver-assistance degradation strategy mapping table includes a one-to-one mapping relationship between the failure condition of the driver-assistance function and the driver-assistance degradation level, and also includes a one-to-one mapping relationship between the driver-assistance degradation level and the driver-assistance strategy. The failure condition of the driver-assistance function may be identified by whether multiple sensors and multiple actuators of the vehicle are faulty. The driver-assistance strategy may be identified by whether multiple driver-assistance functions are operating normally or are operating in a degraded manner (including a degraded operation level).

After the failure condition of the driver-assistance function of the target vehicle is determined, the driver-assistance degradation strategy mapping table is queried according to the failure condition of the driver-assistance function of the target vehicle to determine the driver-assistance degradation level matched with the failure condition of the driver-assistance function of the target vehicle, and the driver-assistance degradation strategy mapping table may be queried according to the driver-assistance degradation level to determine the driver-assistance strategy matched with the driver-assistance degradation level for continuing to assist in driving.

Optionally, a system diagnosis module and a planning module may be configured in the driver-assistance system. The system diagnosis module is configured to query the driver-assistance degradation strategy mapping table according to the failure condition of the driver-assistance function of the target vehicle after the failure condition of the driver-assistance function of the target vehicle is determined, so as to determine the driver-assistance degradation level matched with the failure condition of the driver-assistance function of the target vehicle, and send the driver-assistance degradation level to the planning module. The planning module is configured to query the driver-assistance degradation strategy mapping table according to the driver-assistance degradation level after the driver-assistance degradation level is received so as to determine a driver-assistance strategy matched with the driver-assistance degradation level, and send a control instruction corresponding to the driver-assistance strategy to an actuator so as to execute the driver-assistance strategy.

After the driver-assistance is continued according to the driver-assistance strategy, whether the driver is required to take over the driving operation is determined based on the failure condition of the driver-assistance function of the target vehicle. If the failure condition of the driver-assistance function of the target vehicle satisfies the preset condition, for example, the driver-assistance system fails or nearly fails, then the driver may be prompted to take over the operation. It should be noted that the driver-assistance system of the target vehicle may be exited only after the driver successfully takes over the driving operation.

According to the technical schemes of the embodiments of the present application, when a faulty sensor or a faulty actuator or a faulty software function module exists in the driver-assistance system, the driver-assistance function is not directly quitted, the failure condition of the driver-assistance function of the target vehicle is determined according to the diagnosis information of the multiple sensors, the diagnosis information of the multiple actuators, and the diagnosis information of the multiple modular software functions, the driver-assistance strategy is determined according to the failure condition of the driver-assistance function of the vehicle, and the driver-assistance is continued according to the driver-assistance strategy, so that the stability and the fault tolerance of the driver-assistance system are improved.

Embodiment Two

FIG. 2 is a flowchart of a driver-assistance method according to an embodiment two of the present application. This embodiment is described on the basis of the foregoing embodiments, the determination of the failure condition of the driver-assistance function of the target vehicle according to the diagnosis information of the multiple sensors, the diagnosis information of the multiple actuators, and the diagnosis information of the multiple modular software functions may be that: if diagnosis information of at least one sensor and/or diagnosis information of at least one actuator indicate an abnormality, and the diagnosis information of the multiple modular software functions indicates a normality, then a failure condition of a driver-assistance function corresponding to a target function link is determined according to role information of the at least one sensor and/or the at least one actuator in the target function link.

As shown in FIG. 2, the driver-assistance method provided in this embodiment includes the following steps.

In S210, diagnosis information of multiple sensors of a target vehicle, diagnosis information of multiple actuators of the target vehicle, and diagnosis information of multiple modular software functions are acquired in real time.

In S220, if diagnosis information of at least one sensor and/or diagnosis information of at least one actuator indicate an abnormality, and the diagnosis information of the multiple modular software functions indicates a normality, then a failure condition of a driver-assistance function corresponding to a target function link is determined according to role information of the at least one sensor and/or the at least one actuator in the target function link.

The target function link refers to a hardware link corresponding to any one of driver-assistance functions, and the hardware link includes multiple sensors and/or multiple actuators and corresponding to any one of driver-assistance functions.

Optionally, the target function link may include at least one of: a lateral control function link, a longitudinal control function link, or a lane change control function link.

As an embodiment, the lateral control function link includes a primary camera device, a secondary camera device, a display device, and a steering device. The longitudinal control function link includes a primary camera device, a secondary camera device, a front radar device, a display device, a power device, and a brake device. The lane change control function link includes a left front corner radar device, a left rear corner radar device, a right front corner radar device, and a right rear corner radar device.

The schematic diagram of installation of the left front corner radar device, the left rear corner radar device, the right front corner radar device, the right rear corner radar device, the primary camera device, the secondary camera device, and the front radar device may be shown in FIG. 3.

In a case where the diagnosis information of the multiple modular software functions indicates a normality, the failure condition of the driver-assistance function may be determined based on the diagnosis information of the sensor and/or the diagnosis information of the actuator, and the failure condition of the driver-assistance function corresponding to the target function link may be analyzed according to the role information of the sensor and/or the actuator whose diagnosis information indicates the abnormality in the target function link.

The role information of the sensor in the target function link indicates the function importance or non-substitutability of the sensor in the target function link, or the role information of the actuator in the target function link indicates the function importance or non-substitutability of the actuator in the target function link, or the role information of the sensor and the actuator in the target function link respectively indicates the function importance or non-substitutability of the sensor and the actuator in the target function link. The lane change control function link is used as an example, the left rear corner radar device, the right rear corner radar device, the left front corner radar device, and the right front corner radar device are configured to measure a distance between four corners of the vehicle. The role information of the left rear corner radar device, the right rear corner radar device, the left front corner radar device, and the right front corner radar device in the lane change control function link is the same.

If the function of the sensor and/or the actuator in the target function link is not replaceable, then upon the diagnosis information of the sensor and/or the diagnosis information of the actuator indicate an abnormality, the driver-assistance function corresponding to the target function link may be determined to be failed. If the function of the sensor and/or the actuator in the target function link is replaceable, then the driver-assistance function corresponding to the target function link may be determined to be failed or partially failed even if the diagnosis information of the sensor and/or the diagnosis information of the actuator indicate an abnormality.

As an optional embodiment, the determination of the failure condition of the driver-assistance function corresponding to the target function link according to the role information of the at least one sensor and/or the at least one actuator in the target function link may be that: if the at least one sensor includes one sensor which is connected to the target function link in series, then the driver-assistance function corresponding to the target function link is determined to be failed; if the at least one actuator includes one actuator which is connected to the target function link in series, then the driver-assistance function corresponding to the target function link is determined to be failed; if the at least one sensor includes one sensor which is connected to the target function link in series and the at least one actuator includes one actuator which is connected to the target function link in series, then the driver-assistance function corresponding to the target function link is determined to be failed.

Multiple sensors and/or multiple actuators whose diagnosis information indicates an abnormality are analyzed, if one sensor which is connected to the target function link in series exists in these sensors, then the driver-assistance function corresponding to the target function link is determined to be failed; if one actuator which is connected to the target function link in series exists in these actuators, then the driver-assistance function corresponding to the target function link is determined to be failed; and if one sensor which is connected to the target function link in series exists in these sensors and one actuator which is connected to the target function link in series exists in these actuator, then the driver-assistance function corresponding to the target function link is determined to be failed. The serial connection means that the function is not replaceable.

The lane change control function link is used as an example, if the left rear corner radar device, the right rear corner radar device, the left front corner radar device, and the right front corner radar device are all connected to the target function link in series, and the number of each of the left rear corner radar device, the right rear corner radar device, the left front corner radar device, and the right front corner radar device is one, then the diagnosis information of any one of the left rear corner radar device, the right rear corner radar device, the left front corner radar device, and the right front corner radar device indicates an abnormality, the driver-assistance function corresponding to the target function link is determined to be failed, that is, the automatic lane change function fails.

As an optional embodiment, the determination of the failure condition of the driver-assistance function corresponding to the target function link according to the role information of the at least one sensor and/or the at least one actuator in the target function link may be that: if the at least one sensor is connected to the target function link in parallel, then the driver-assistance function corresponding to the target function link is determined to be valid, a fault level of a valid driver-assistance function corresponding to the target function link is determined according to weight information of the at least one sensor in the target function link; if the at least one actuator is connected to the target function link in parallel, then the driver-assistance function corresponding to the target function link is determined to be valid, and a fault level of a valid driver-assistance function corresponding to the target function link is determined according to weight information of the at least one actuator in the target function link; and if the at least one sensor and the at least one actuator is connected to the target function link in parallel, then the driver-assistance function corresponding to the target function link is determined to be valid, and a fault level of a valid driver-assistance function corresponding to the target function link is determined according to weight information of the at least one sensor and/or the at least one actuator in the target function link.

Multiple sensors and/or multiple actuators whose diagnosis information indicates an abnormality are analyzed, if any one sensor of the sensors are connected in parallel to the target function link, then the driver-assistance function corresponding to the target function link is determined to be valid; if any one actuator of these actuators are connected in parallel to the target function link, then the driver-assistance function corresponding to the target function link may be determined to be valid; if any one sensor of the sensors and any one actuator of the actuators are connected in parallel to the target function link, then the driver-assistance function corresponding to the target function link is determined to be valid. The parallel connection means that the function may be replaced. It should be noted that when diagnosis information of all sensors connected to the target function link in parallel and diagnosis information of all actuators connected to the target function link in parallel indicate an abnormality, the driver-assistance function corresponding to the target function link fails.

After the driver-assistance function corresponding to the target function link is determined to be valid, the fault level of the valid driver-assistance function corresponding to the target function link may also be determined according to the weight information of the multiple sensors and/or the multiple actuators whose diagnosis information indicate the abnormality in the target function link. The weight of the sensor and/or the actuator in the target function link is the larger, the fault level of the driver-assistance function corresponding to the target function link is the higher.

That is, when the failure condition of the driver-assistance function corresponding to the target function link is determined according to the role information of the at least one sensor and/or the at least one actuator in the target function link, if the driver-assistance function corresponding to the target function link is determined to be valid, it is also necessary to determine the fault level of the valid driver-assistance function.

A function link corresponding to a longitudinal control function is used as an example, the display device, the power device, and the brake device are connected to the target function link in series, and the primary camera device, the secondary camera device, and the front radar device are connected to the target function link in parallel. It is assumed that weights of the primary camera device, the secondary camera device, and the front radar device in the target function link are successively decreased, if the diagnosis information of any one or both of the primary camera device, the secondary camera device, and the front radar device indicates an abnormality, then the driver-assistance function corresponding to the target function link is determined to be valid, that is, the longitudinal control function is valid. Compared to when the diagnosis information of the secondary camera device indicates an abnormality, when the diagnosis information of the front radar device indicates an abnormality, the fault level of the longitudinal control function is lower.

Figure 4:
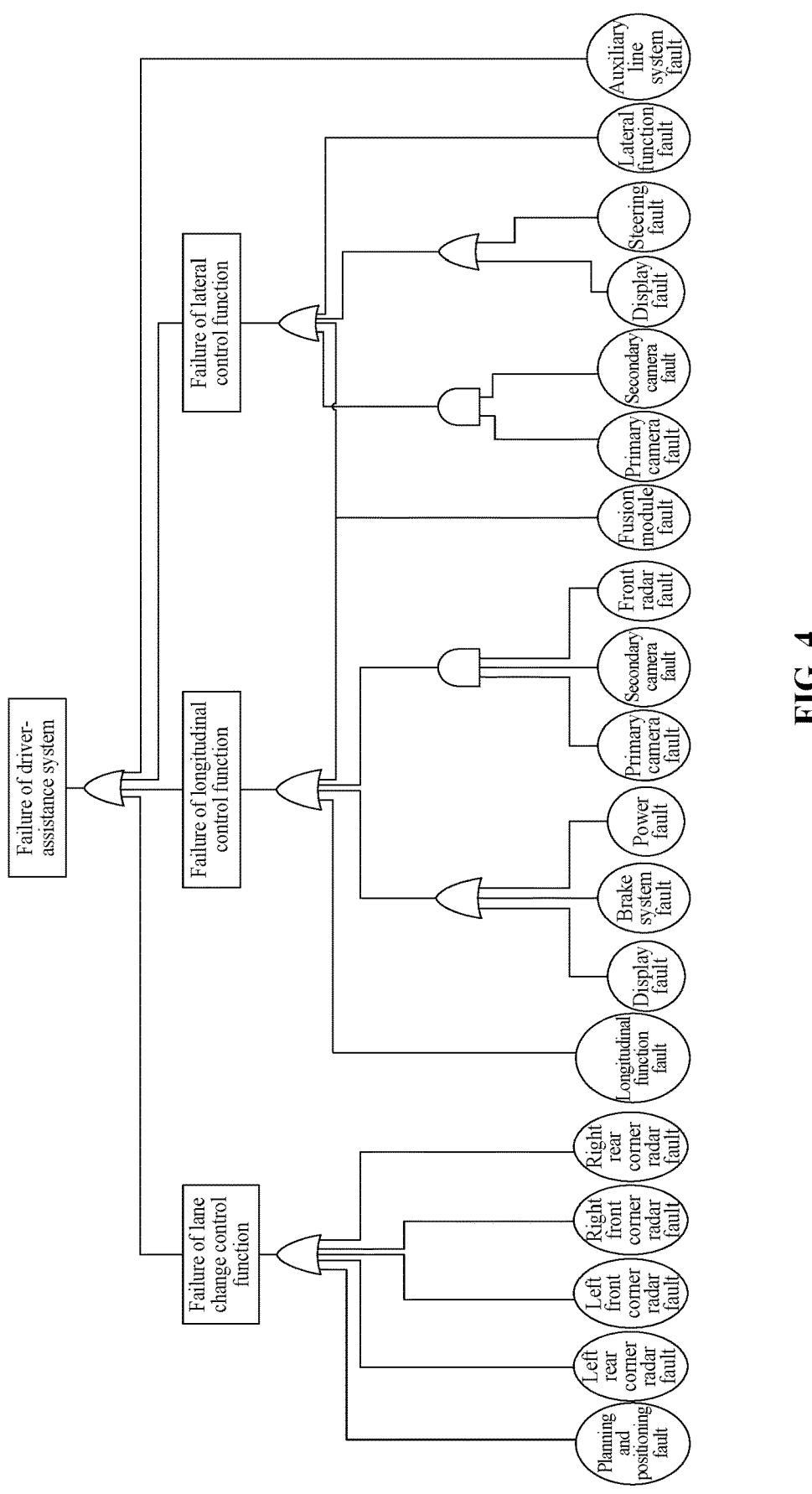
FIG. 4 is a schematic diagram of a driver-assistance function failure analysis according to an embodiment two of the present application.

In an example, referring to FIG. 4, a schematic diagram of a driver-assistance function failure analysis is shown in FIG. 4, one left rear corner radar, one left front corner radar, one right rear corner radar, and one right front corner radar are all connected in series to the lane change control function link, when any one radar of the left rear corner radar, the left front corner radar, the right rear corner radar, and the right front corner radar is abnormal, the lane change control function corresponding to the lane change control function link may be determined to be failed. The display device, one power device and one brake device are all connected to the longitudinal control function link in series, and the primary camera, the secondary camera and the front radar are all connected to the longitudinal control function link in parallel, so that when any one device of the display device, the power device and the brake device is abnormal, the longitudinal control function corresponding to the longitudinal control function link is determined to be failed; when the display device, the power device, and the brake device are normal but any one device or both devices of the primary camera, the secondary camera and the front radar are abnormal, the longitudinal control function corresponding to the longitudinal control function link is determined to be valid, but it is still necessary to determine the fault level of the longitudinal control function according to the weight of the abnormal device on the longitudinal control function link.

One display device and one steering device are connected to the lateral control function link in series, and the primary camera and the secondary camera are connected to the longitudinal control function link in parallel. When the display device or the steering device is abnormal, the side control function corresponding to the lateral control function link may be determined to be failed.

When the display device and the steering device are normal but the primary camera or the secondary camera is abnormal, the lateral control function corresponding to the longitudinal control function link may be determined to be valid, but it is still necessary to determine the fault level of the lateral control function according to the weight of the abnormal camera on the lateral control function link.

After the diagnosis information of the multiple modular software functions is acquired, if a modular software function in which the diagnosis information indicates an abnormality exists, then the driver-assistance function corresponding to the modular software function fails. For example, if the diagnosis information of the lateral control software function module indicates an abnormality, then the corresponding lateral control function fails.

In S230, a driver-assistance strategy of the target vehicle is determined according to the failure condition of the driver-assistance function of the target vehicle, and the target vehicle is continued to be assisted in driving according to the driver-assistance strategy.

For details not explained in this embodiment, reference is made to the foregoing embodiments, and details are not described herein.

In the above technical schemes, if the diagnosis information of the at least one sensor and/or the diagnosis information of the at least one actuator indicate an abnormality, and the diagnosis information of the multiple modular software functions indicate a normality, then the failure condition of the driver-assistance function corresponding to the target function link may be determined according to the role information of the at least one sensor and/or the at least one actuator in the target function link, whereby the failure condition of the driver-assistance function is analyzed accurately, so that the diagnosis in the event of the sensor failure or the actuator failure or the software function module failure has a certain fault tolerance capability, thereby improving the stability of the driver-assistance system.

Embodiment Three

FIG. 5 is a flowchart of a driver-assistance method according to an embodiment three of the present application. This embodiment is described on the basis of the foregoing embodiments. When the diagnosis information of the multiple sensors of the target vehicle, the diagnosis information of the multiple actuators of the target vehicle, and the diagnosis information of the multiple modular software functions are acquired in real time, the method may further include that: diagnosis information of a main line system sent by an auxiliary line system is received in real time, where the main line system and the auxiliary line system are distributed in different chips or different cores. Accordingly, the determination of the failure condition of the driver-assistance function of the target vehicle according to the diagnosis information of the multiple sensors, the diagnosis information of the multiple actuators, and the diagnosis information of the multiple modular software functions may include: if the diagnosis information of the main line system indicates a normality or part of the diagnosis information indicates an abnormality, then the failure condition of the driver-assistance function of the target vehicle is determined according to the diagnosis information of the multiple sensors, the diagnosis information of the multiple actuators, and the diagnosis information of the multiple modular software functions.

As shown in FIG. 5, the driver-assistance method provided in this embodiment includes the following steps.

In S310, diagnosis information of multiple sensors of a target vehicle, diagnosis information of multiple actuators of the target vehicle, diagnosis information of multiple modular software functions, and diagnosis information of the main line system sent by the auxiliary line system are acquired in real time.

In this embodiment, the driver-assistance system adopts the primary-secondary redundancy structure, that is, the isomorphic main line system redundancy and the auxiliary line system redundancy are simultaneously constructed to achieve the driver-assistance function of the vehicle.

The main line system and the auxiliary line system are distributed in different chips, or in different cores of a same chip, thereby achieving the primary-secondary redundancy architecture.

The main line system and the auxiliary line system may perform abnormal diagnosis on each other.

The main line system sends a main line system signal to the auxiliary line system, so that the auxiliary line system performs a fault diagnosis on the main line system according to the main line system signal, and sends the diagnosis information of the main line system to the main line system, and the main line system may determine whether the main line system itself is normal according to the received diagnosis information of the main line system. Meanwhile, the main line system also receives the auxiliary line system signal in real time, performs a fault diagnosis on the auxiliary line system according to the auxiliary line system signal, and sends the diagnosis information of the auxiliary line system to the auxiliary line system, so that the auxiliary line system determines whether the auxiliary line system itself is normal according to the received diagnosis information of the auxiliary line system.

In S320, if the diagnosis information of the main line system indicates a normality or part of the diagnosis information indicates an abnormality, then the failure condition of the driver-assistance function of the target vehicle is determined according to the diagnosis information of the multiple sensors, the diagnosis information of the multiple actuators, and the diagnosis information of the multiple module software.

If the diagnosis information of the main line system sent by the auxiliary line system indicates a normality or part of the diagnosis information indicates an abnormality, that is, it is indicated that the main line system is faulty and the main line system is not caused to be completely unavailable, the main line system may confirm that the main line system itself may maintain normal basic functions, and determine the operation of the failure condition of the driver-assistance function of the target vehicle according to the diagnosis information of the multiple sensors, the diagnosis information of the multiple actuators, and the diagnosis information of the multiple modular software functions.

If the diagnosis information of the at least one sensor and/or the diagnosis information of the at least one actuator indicate an abnormality, and the diagnosis information of the multiple modular software functions indicate a normality, then the main line system may determine the failure condition of the driver-assistance function corresponding to the target function link according to the role information of the at least one sensor and/or the at least one actuator in the target function link.

The main line system performs a fault diagnosis on the auxiliary line system in real time, and sends the diagnosis information of the auxiliary line system to the auxiliary line system. When the diagnosis information of the auxiliary line system indicates an abnormality, the main line system may determine that backup of the driver-assistance function of the target vehicle fails, and regard the failure of the backup of the driver-assistance function of the target vehicle as the failure condition of the driver-assistance function of the target vehicle.

If the diagnosis information of the main line system sent by the auxiliary line system indicates an abnormality, that is, a failure of the main line system cannot maintain the normal basic function, then the auxiliary line system works instead of the main line system so as to ensure the minimum safety function, that is, the auxiliary line system determines the failure condition of the driver-assistance function of the target vehicle according to the diagnosis information of the multiple sensors, the diagnosis information of the multiple actuators, and the diagnosis information of the multiple modular software functions, the driver-assistance strategy of the target vehicle is determined according to the failure condition of the driver-assistance function of the target vehicle, and the target vehicle is continued to be assisted in driving according to the driver-assistance strategy.

The auxiliary line system may also acquire the diagnosis information of the multiple sensors of the target vehicle, the diagnosis information of the multiple actuators of the target vehicle, and the diagnosis information of the multiple modular software functions in real time. If the diagnosis information of the at least one sensor and/or the diagnosis information of the at least one actuator indicate an abnormality, and the diagnosis information of the multiple modular software functions indicate a normality, then the auxiliary line system may determine the failure condition of the driver-assistance function corresponding to the target function link according to the role information of the at least one sensor and/or the at least one actuator in the target function link.

In S330, a driver-assistance strategy of the target vehicle is determined according to the failure condition of the driver-assistance function of the target vehicle, and the target vehicle is continued to be assisted in driving according to the driver-assistance strategy.

For details not explained in this embodiment, reference is made to the foregoing embodiments, and details are not described herein.

In the above-described technical schemes, a dual-chip primary-secondary redundancy architecture is adopted, that is, the driver-assistance function is achieved by redundancy of a main line system and an auxiliary line system, and a sensor fault, an actuator fault, a software function module fault, a main line chip fault and an auxiliary line chip fault are uniformly considered, so that a driver-assistance strategy corresponding to a current fault condition of the vehicle is determined, and the vehicle is continued to be assisted in driving according to the corresponding driver-assistance strategy, thereby improving the stability and the fault tolerance of the driver-assistance system.

Embodiment Four

This embodiment provides an embodiment for a driver-assistance method based on the foregoing embodiments. For a multi-sensor multi-function driver-assistance system, each function module needs to have an independent diagnosis function. In this embodiment, a centralized diagnosis degradation module and a planning module are provided, where the centralized diagnosis degradation module determines a driver-assistance grading degradation level according to different fault conditions, and the planning module performs a driver-assistance planning according to the driver-assistance grading degradation level so as to continue to be assisted in driving by using a driver-assistance strategy matched with the driver-assistance grading degradation level.

Referring to the schematic diagram of an installation of an automobile device shown in FIG. 3, a vehicle platform is configured with 5 millimeter-wave radars, the 5 millimeter-wave radars are respectively installed at the center of a front bumper and at the left front corner, the right front corner, the left rear corner, and the right rear corner of the vehicle. In addition to the millimeter-wave radars, 2 cameras (a primary camera and a secondary camera) are provided, the 2 cameras are forward cameras, and are configured to sense a forward target and a lane line, thereby achieving the certain redundancy.

The driver-assistance method provided in this embodiment is applied to the module architecture shown in FIG. 6. As shown in FIG. 6, the centralized diagnosis degradation module 601 is configured to acquire diagnosis information of multiple sensors 602 of a vehicle, diagnosis information of multiple actuators 603 of the vehicle, diagnosis information of a modular software function 604 (which may include a human-machine interaction system 6041), and diagnosis information of a control unit 605 in real time, query a preset driver-assistance degradation strategy mapping table when at least one diagnosis information indicates an abnormality, acquire a driver-assistance degradation level corresponding to a current fault, and send the driver-assistance degradation level to a planning module 607. The planning module 607 is configured to query the driver-assistance degradation strategy mapping table according to the received driver-assistance degradation level, acquire a driver-assistance strategy corresponding to the driver-assistance degradation level, generate a corresponding control instruction according to the driver-assistance strategy, and send the corresponding control instruction to the corresponding actuator 603, so that the corresponding actuator executes the degraded driver-assistance strategy, and meanwhile, may also send a corresponding control prompt to the human-machine interaction system 6041 so as to perform a fault and a degraded driver-assistance prompt to the driver.

In addition, in this embodiment, a dual-chip primary-secondary redundancy architecture is adopted, and the driver-assistance function is achieved by the redundancy of the main line system and the auxiliary line system, and the main line system and the auxiliary line system are distributed between different chips or different cores.

Figure 7:
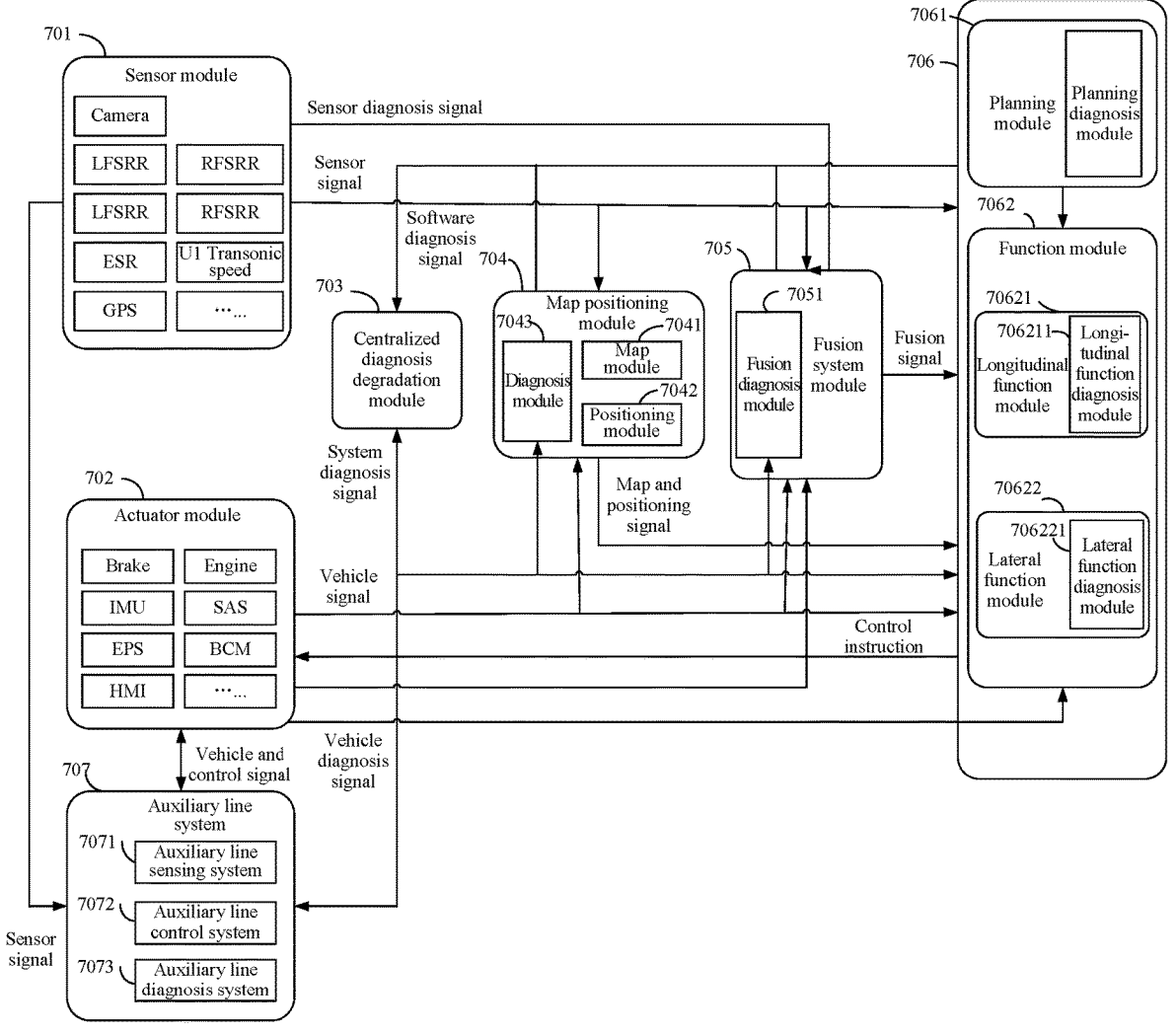
FIG. 7 is a schematic diagram of a module architecture for which another driver-assistance method is suitable according to an embodiment four of the present application is applicable.

FIG. 7 shows a module architecture for the driver-assistance method provided in this embodiment, the module architecture may be applied to the Level 3 driver-assistance system and is also capable of being downward compatible with the Level 2 driver-assistance system. As shown in FIG. 7, the system architecture includes a sensor module 701, an actuator module 702, a centralized diagnosis degradation module 703, a map positioning module 704, a fusion system module 705, a planning control module 706, and an auxiliary line system 707.

The sensor module 701 includes a camera, a millimeter wave radar, and the like. The actuator module 702 includes a brake system, a steering system, a power system, a vehicle body system, and the like. The map positioning module 704 includes a map module 7041, a positioning module 7042 and a diagnosis module 7043. The fusion system module 705 includes a fusion diagnosis module 7051. The planning control module 706 includes a planning module 7061 and a function module 7062, where the planning module 7061 includes a planning diagnosis module 70611, the function module 70622 includes a longitudinal function module 70621 and a lateral function module 70622, the longitudinal function module 70621 includes a longitudinal function diagnosis module 706211, and the lateral function module 70622 includes a lateral function diagnosis module 706221. The auxiliary line system 707 includes an auxiliary line sensing system 7071, an auxiliary line control system 7072, and an auxiliary line diagnosis system 7073.

The centralized diagnosis degradation module 703 is configured to perform a system level monitoring according to the diagnosis signal of the sensor, the diagnosis signal of the actuator, and the diagnosis signal of the multiple function modules. Meanwhile, the centralized diagnosis degradation module 703 is configured to send a diagnosis signal to the auxiliary line diagnosis system 7073 so that the auxiliary line diagnosis system 7073 performs a fault diagnosis on the main line system according to the diagnosis signal, and feeds back diagnosis information of the main line system to the centralized diagnosis degradation module 703, and further so that the centralized diagnosis degradation module 703 determines whether the main line system is normal according to the diagnosis information of the main line system. In addition, the centralized diagnosis degradation module 703 is also configured to receive a diagnosis signal sent by the auxiliary line diagnosis system 7073 in real time, diagnose the auxiliary line system according to the diagnosis signal, generate diagnosis information of the auxiliary line system, and send the diagnosis information to the auxiliary line diagnosis system 7073, so that the auxiliary line diagnosis system 7073 determines whether the auxiliary line system is normal according to the diagnosis information of the auxiliary line system.

When the centralized diagnosis degradation module 703 determines that the main line system is normal or partially abnormal (the main line system is available), a fault code is generated according to the diagnosis signal of the sensor, the diagnosis signal of the actuator, and the diagnosis signal of the multiple function modules, a driver-assistance degradation level is determined based on the fault code, and the driver-assistance degradation level is sent to the planning module 7061. The planning module 7061 is configured to plan the driver-assistance strategy according to the driver-assistance degradation level, and generate a control instruction according to the driver-assistance strategy and sent the control instruction to the function module 7062. The function module 7062 is configured to receive, in addition to the signals of the sensor module 701 and the actuator module 702, the control instruction of the planning module 7061 to implement a degraded driver-assistance function.

When the main line system fails and is not available, for example, when the fusion system module 705, the longitudinal function module 70621 and the lateral function module 70622 fail, the main line system cannot maintain a normal basic function, then the auxiliary line system 707 replaces the main line system for operation, thereby ensuring the minimum safety function.

Figure 8:
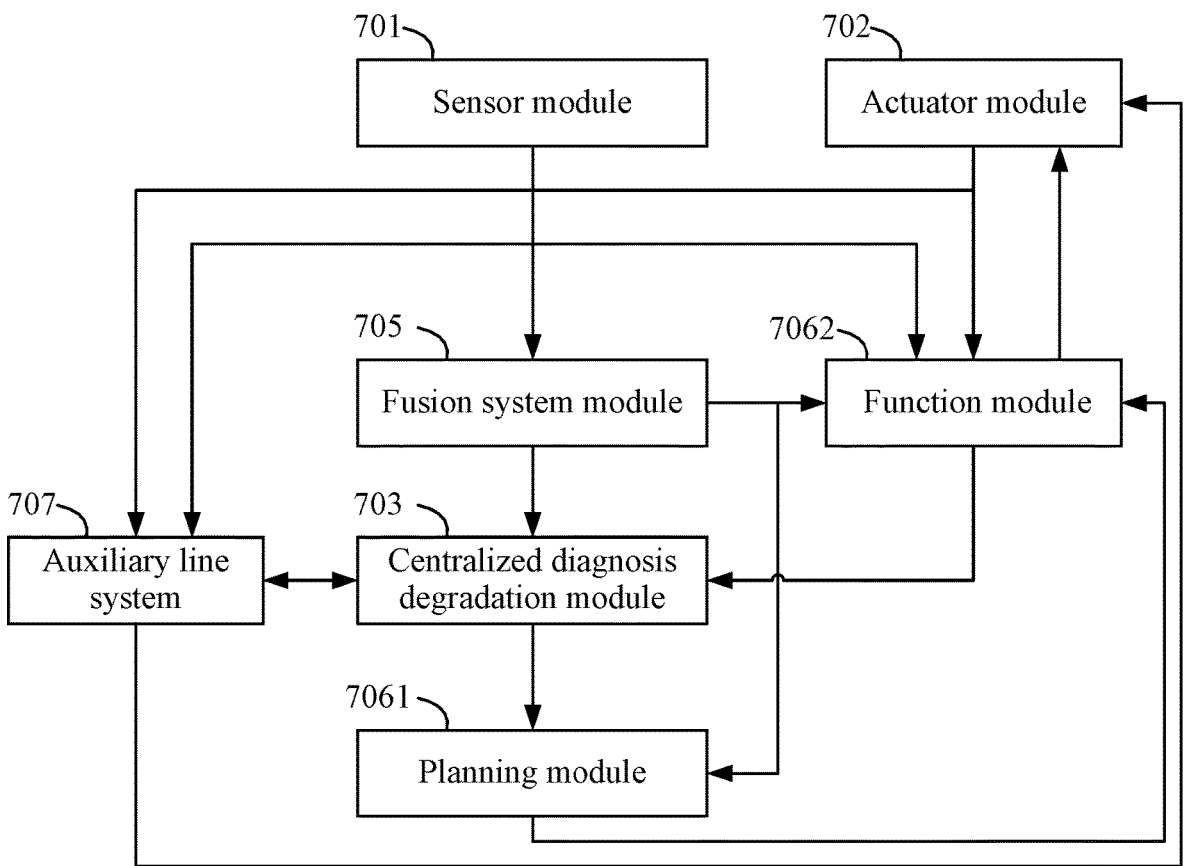
FIG. 8 is a schematic diagram of a signal flow for which a driver-assistance method is suitable according to an embodiment four of the present application.

As shown in FIG. 8, the signal flow applicable to the module architecture shown in FIG. 7 is: the fusion system module 705 is configured to receive an input from the sensor module 701 so as to generate the diagnosis information, and send the diagnosis information to the centralized diagnosis degradation module 703 and the planning module 7061. At the same time, the fusion system module 705 will also input a sensing state as a function input signal into the function module 7062 so as to implement the function self-check. The function module 7062 is configured to receive, besides the diagnosis signal from the fusion system module 705, a sensing signal from the sensor module 701 and a vehicle signal from the actuator module 702 to implement a function, and send a self-checking result of whether this function has a fault to the centralized diagnosis degradation module 703, so as to implement the diagnosis of all modules by the centralized diagnosis degradation module 703, and meanwhile, the function module 7062 is further configured to send a signal for controlling the entire vehicle to the actuator module 702, so as to implement the control of the actuator module 702. In addition, the auxiliary line system 707 is configured to send a working state of the auxiliary line module to the centralized diagnosis degradation module 703, when a diagnosis fault exists and does not cause the main line system to become completely unavailable, the centralized diagnosis degradation module 703 generates a degradation code and sends the degradation code to the planning module 7061, and the planning module 7061 sends an instruction to the function module 7062 according to the degradation code and the driver-assistance degradation strategy mapping table to implement the degradation. If the main line system is completely unavailable, then the auxiliary line system 707 takes over the function of the main line system, and the driver-assistance function is achieved by sending a control instruction to the actuator module 702, and the driver-assistance may be performed through an auxiliary line sensing system 7071, an auxiliary line control system 7072 and an auxiliary line diagnosis system 7073 included in the auxiliary line system 707 so as to achieve the minimum safety function.

When the centralized diagnosis degradation module 703 achieves the system-level monitoring according to the diagnosis signal of the sensors, the diagnosis signal of the actuators, and the diagnosis signal of the multiple function modules and determines the failure condition of the driver-assistance function of the vehicle, the centralized diagnosis degradation module 703 may analyze the failure condition of the driver-assistance function based on the function module covered by the driver-assistance system. From the analysis of execution level, the functions include a lateral function, a longitudinal function, and a lane change function with a planning part. Each type of function among the three types of functions includes roughly three parts from sensing, planning, and execution. The fault analysis needs to consider whether each part has a case that multiple hardware or software are simultaneously completed. For the serial and unique module, once the module fails, it is considered that the whole function link where the module is located is considered to be failed and the function of the module is failed. For modules existing in parallel, the whole function link where the modules are located is valid under other conditions unless all modules fail, and at this time, the function degradation needs to be performed to different degrees according to the performance of the failed module and the weight set for the contribution to the whole system.

If the diagnosis information of the at least one sensor and/or the diagnosis information of the at least one actuator indicate an abnormality, and the diagnosis information of the multiple modular software functions indicate a normality, then the centralized diagnosis degradation module 703 determines the failure condition of the driver-assistance function corresponding to the target function link according to the role information of the at least one sensor and/or the at least one actuator in the target function link. If the at least one sensor includes one sensor which is connected to the target function link in series, then the centralized diagnosis degradation module 703 determines that the driver-assistance function corresponding to the target function link fails. If the at least one actuator includes one actuator which is connected to the target function link in series, then the centralized diagnosis degradation module 703 determines that the driver-assistance function corresponding to the target function link fails. If the at least one sensor includes one sensor which is connected to the target function link in series and the at least one actuator includes one actuator which is connected to the target function link in series, then the centralized diagnosis degradation module 703 determines that the driver-assistance function corresponding to the target function link fails. If the at least one sensor and/or the at least one actuator are connected to the target function link in parallel, then the centralized diagnosis degradation module 703 determines that the driver-assistance function corresponding to the target function link is valid, and may determine the fault level of the valid driver-assistance function corresponding to the target function link according to the weight information of the at least one sensor and/or the at least one actuator in the target function link.

Exemplarily, the centralized diagnosis degradation module 703 achieves the system-level monitoring according to the diagnosis signal of the sensors, the diagnosis signal of the actuators, and the diagnosis signal of the multiple function modules and determines the failure condition of the driver-assistance function of the vehicle. Reference may be made to the schematic diagram of the driver-assistance function failure analysis shown in FIG. 4.

In this example, the reason for the failure of the driver-assistance system may include 4 parts, that is, the failure of the lane change control function, the failure of the longitudinal control function, the failure of the lateral control function, and the failure of the auxiliary line system. However, not all functions fail due to the failure of a single function. Therefore, the driver-assistance degradation strategy mapping table needs to be designed based on the failure tree analysis result, the function minimum sensor configuration, and the failure severity.

If any one of the left rear corner radar, the left front corner radar, the right front corner radar, and the right rear corner radar fails, the lane change control function will fail. When a positioning module fault (software module fault) is planned, the positioning module fault includes a positioning map module fault and an internal software module fault of the planning module other than the external hardware, which may also cause a failure of the lane change control function.

The reasons for the failure of the longitudinal control function may be divided into two types. One reason is a failure of an actuator end, namely, a display failure, a brake system failure and a power system failure, and the occurrence of any one of these three types of faults will cause the longitudinal control function to be failed. Another reason is the complete lack of perception ability.

In this case, the simultaneous occurrence of a primary camera fault, a secondary camera fault, and a front radar failure will result in complete failure of the longitudinal function. When a single failure occurs, the longitudinal control function will not be immediately exited, but will operate in the degradation mode of the longitudinal control function, which needs to be designed in the driver-assistance degradation strategy mapping table. However, when an internal software module is faulty, due to the serial permission of the internal software module, it will directly cause the longitudinal control function to be failed, where the software module fault may include the longitudinal function module fault and the fusion module fault.

The failure of the lateral control function may also be divided into two types. One reason is a failure of an actuator end, namely, a display failure and a steering system failure. If either fault of these two types of faults occurs, then a transverse control function fails completely. Another reason is the complete loss of a transverse control data source capability. For example, when the primary camera and the secondary camera fail simultaneously, the transverse control function fails. When a single failure occurs, the lateral control function will not be immediately exited, but will work in the degradation mode of the lateral control function, which needs to be designed in the driver-assistance degradation strategy mapping table. In addition, it also includes a case of the failure of the internal software module. Due to the serial permission of the internal software module, it will directly cause the transverse control function module to be failed, where the software module fault may include the lateral function module fault and the fusion module fault.

Exemplarily, FIG. 9 shows an example of a driver-assistance degradation strategy mapping table in which a single-point failure is considered as a main consideration, a double-point failure is considered for a forward key region, different sensor and actuator function failures are divided into different degradation levels, and a driver-assistance degradation level is assigned, and different driver-assistance degradation levels correspond to different degradation strategies. In FIG. 9, "OK" indicates normality or valid, "Failed", "Error" and "Unavaliable" indicate abnormality or invalid, and "Degrd" indicates degradation.

For example, in FIG. 9, the driver-assistance degradation level being 1.1 is used as an example, the fault source is GPS, that is, when only the diagnosis information of GPS indicates an abnormality, the driver-assistance degradation level is 1.1, and a corresponding driver-assistance degradation strategy is that the driver-assistance of Level 3 is unavailable, the positioning function fails, and other driver-assistance functions are valid.

In addition, in the driver-assistance degradation strategy mapping table, it is also possible to perform degradation valid design for some driver-assistance functions, such as degradation one (Degrd (1)), degradation two (Degrd (2)), degradation three (Degrd (3)), and degradation four (Degrd (4)) in FIG. 9. For the same driver-assistance function, implementation manners corresponding to different degradation levels are different, which is not limited in this embodiment. For details not explained in this embodiment, reference is made to the foregoing embodiments, and details are not described herein.

According to the above-described technical schemes, diagnosis and certain fault tolerance capability of sensor faults and function module faults can be achieved, the stability of the assistance system is improved, the cross-module cooperation is achieved through the top-level diagnosis center and the degradation planning module when faults exist, and the degradation of the driver-assistance function is achieved cooperatively. Moreover, the design of the primary-secondary redundancy system enables the primary-secondary system to achieve the mutual verification, and satisfies the requirement of a Level driver-assistance system on the redundant design.

Embodiment Five

Figure 10:
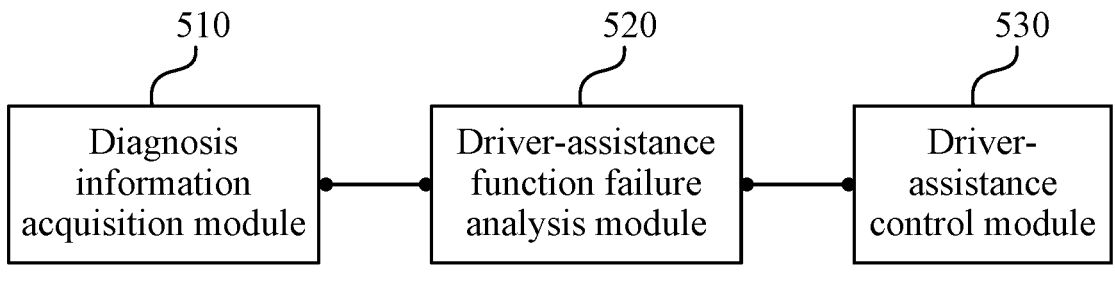
FIG. 10 is a schematic structural diagram of a driver-assistance apparatus according to an embodiment five of the present application.

FIG. 10 is a schematic structural diagram of a driver-assistance apparatus according to an embodiment five of the present application. This embodiment may be applied to a scenario in which a vehicle equipped with an advanced driver-assistance system performs a driver-assistance function, for example, a case where a vehicle equipped with an Level 3 driver-assistance system performs a driver-assistance function. The apparatus may be implemented in software and/or hardware, and may be generally integrated in a vehicular device. As shown in FIG. 10, the driver-assistance apparatus includes a diagnosis information acquisition module 510, a driver-assistance function failure analysis module 520, and a driver-assistance control module 530.

The diagnosis information acquisition module 510 is configured to acquire, in real time, diagnosis information of multiple sensors of a target vehicle, diagnosis information of multiple actuators of the target vehicle, and diagnosis information of multiple modular software functions. The driver-assistance function failure analysis module 520 is configured to determine a failure condition of a driver-assistance function of the target vehicle according to the diagnosis information of the multiple sensors, the diagnosis information of the multiple actuators, and the diagnosis information of the multiple modular software functions. The driver-assistance control module 530 is configured to determine a driver-assistance strategy of the target vehicle according to the failure condition of the driver-assistance function of the target vehicle, and continue to assist in driving the target vehicle according to the driver-assistance strategy.

According to the technical schemes of the embodiments of the present application, when a faulty sensor or a faulty actuator or a faulty software function module exists in the driver-assistance system, the driver-assistance function is not directly quitted, a failure condition of a driver-assistance function of the vehicle is determined according to the diagnosis information of the multiple sensors, the diagnosis information of the multiple actuators, and the diagnosis information of the multiple modular software functions, the driver-assistance strategy is determined according to the failure condition of the driver-assistance function of the vehicle, and the driver-assistance is continued according to the driver-assistance strategy, so that the stability and the fault tolerance of the driver-assistance system are improved.

Optionally, the driver-assistance function failure analysis module 520 is configured to determine a failure condition of a driver-assistance function corresponding to a target function link according to role information of the at least one sensor and/or the at least one actuator in the target function link in a case where diagnosis information of at least one sensor among the multiple sensors and/or diagnosis information of at least one actuator among the multiple actuators indicate an abnormality, and the diagnosis information of the multiple modular software functions indicates a normality.

Optionally, the driver-assistance function failure analysis module 520 is configured to: determine that the driver-assistance function corresponding to the target function link fails in a case where the at least one sensor includes one sensor which is connected to the target function link in series; determine that the driver-assistance function corresponding to the target function link fails in a case where the at least one actuator includes one actuator which is connected to the target function link in series; and determine that the driver-assistance function corresponding to the target function link fails in a case where the at least one sensor includes one sensor which is connected to the target function link in series and the at least one actuator includes one actuator which is connected to the target function link in series.

Optionally, the driver-assistance function failure analysis module 520 is configured to: determine that the driver-assistance function corresponding to the target function link is valid in a case where the at least one sensor is connected to the target function link in parallel, and determine a fault level of a valid driver-assistance function corresponding to the target function link according to weight information of the at least one sensor in the target function link; determine that the driver-assistance function corresponding to the target function link is valid in a case where the at least one actuator is connected to the target function link in parallel, and determine a fault level of a valid driver-assistance function corresponding to the target function link according to weight information of the at least one actuator in the target function link; and determine that the driver-assistance function corresponding to the target function link is valid in a case where the at least one sensor and the at least one actuator is connected to the target function link in parallel, and determine a fault level of a valid driver-assistance function corresponding to the target function link according to weight information of the at least one sensor and the at least one actuator in the target function link.

Optionally, the target function link includes at least one of: a lateral control function link, a longitudinal control function link, or a lane change control function link.

Optionally, the lateral control function link includes a primary camera device, a secondary camera device, a display device, and a steering device. The longitudinal control function link includes a primary camera device, a secondary camera device, a front radar device, a display device, a power device and a brake device. The lane change control function link includes a left front corner radar device, a left rear corner radar device, a right front corner radar device, and a right rear corner radar device.

Optionally, the driver-assistance function failure analysis module 520 is configured to determine that a driver-assistance function corresponding to the at least one modular software function fails in a case where diagnosis information of at least one modular software function among the multiple modular software functions indicates an abnormality.

Optionally, the above-described apparatus further includes a main line system diagnosis information receiving module. The main line system diagnosis information receiving module is configured to receive diagnosis information of a main line system sent by an auxiliary line system in real time upon acquiring, in real time, the diagnosis information of the multiple sensors of the target vehicle, the diagnosis information of the multiple actuators of the target vehicle, and the diagnosis information of the multiple modular software functions, where the main line system and the auxiliary line system are distributed in different chips or different cores.

Accordingly, the driver-assistance function failure analysis module 520 is configured to determine the failure condition of the driver-assistance function of the target vehicle according to the diagnosis information of the multiple sensors, the diagnosis information of the multiple actuators, and the diagnosis information of the multiple module software in a case where the diagnosis information of the main line system indicates a normality or part of the diagnosis information indicates an abnormality.

The above-described apparatus further includes an auxiliary line system fault diagnosis module. The auxiliary line system fault diagnosis module is configured to: perform a fault diagnosis on the auxiliary line system in real time, and send auxiliary line diagnosis information to the auxiliary line system; and determine that backup of the driver-assistance function of the target vehicle fails in a case where the auxiliary line diagnosis information indicates an abnormality.

Optionally, the driver-assistance control module 530 is configured to: query a preset driver-assistance degradation strategy mapping table according to the failure condition of the driver-assistance function of the target vehicle to determine a driver-assistance degradation level matched with the failure condition of the driver-assistance function; and query the driver-assistance degradation strategy mapping table according to the driver-assistance degradation level to determine a driver-assistance strategy matched with the driver-assistance degradation level.

The driver-assistance apparatus provided in the embodiments of the present application may execute the driver-assistance method provided in any of the embodiments of the present application, and has a corresponding function module for executing the method.

Embodiment Six

Figure 11:
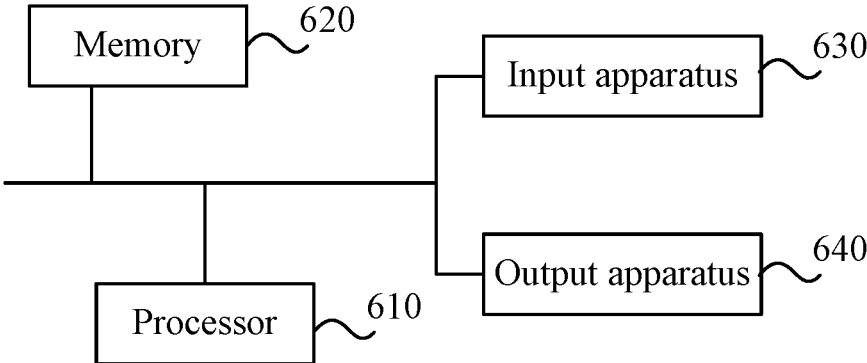
FIG. 11 is a schematic structural diagram of a vehicular device according to an embodiment six of the present application.

FIG. 11 is a schematic structural diagram of a vehicular device according to an embodiment six of the present application. As shown in FIG. 11, the vehicular device includes a processor 610, a memory 620, an input apparatus 630 and an output apparatus 640. The number of processors 610 in the vehicular device may be one or more, and one processor 610 is used as an example in FIG. 11. The processor 610, the memory 620, the input apparatus 630, and the output apparatus 640 in the vehicular device may be connected via a bus or otherwise, and they being connected via a bus is used as an example in FIG. 11.

The memory 620, as a computer-readable storage medium, may be configured to store a software program, a computer-executable program, and a module, such as a program instruction/a module corresponding to the driver-assistance method in the embodiments of the present application (such as, the diagnosis information acquisition module 510, the driver-assistance function failure analysis module 520, and the driver-assistance control module 530 in the driver-assistance apparatus). The processor 610 executes various function applications and data processing of the vehicular device by running a software program, an instruction, and a module stored in the memory 620, that is, implements the above-described driver-assistance method.

The memory 620 may mainly include a storage program region and a storage data region. The storage program region may store an operating system, and an application program required for at least one function. The storage data region may store data and the like created according to the use of the terminal. Moreover, the memory 620 may include a high-speed random access memory, and may also include a non-volatile memory, such as at least one magnetic disk storage device, flash memory device, or other non-volatile solid state storage devices. In some instances, the memory 620 may also include a memory disposed remotely with respect to the processor 610, and the remote memory may be connected to the vehicular device via a network. Instances of such networks include, but are not limited to, an Internet, an enterprise intranet, a local area network, a mobile communication networks, and combinations thereof.

The input apparatus 630 may be configured to receive the input numeric or role information and to generate key signal inputs related to user settings and function control of the vehicular device. The output apparatus 640 may include a display device such as a display screen.

Embodiment Seven

An embodiment seven of the present application further provides a storage medium including a computer-executable instruction. The computer-executable instruction, when executed by a computer processor, are configured to perform a driver-assistance method, the method includes that: diagnosis information of multiple sensors of a target vehicle, diagnosis information of multiple actuators of the target vehicle, and diagnosis information of multiple modular software functions are acquired in real time; a failure condition of a driver-assistance function of the target vehicle is determined according to the diagnosis information of the multiple sensors, the diagnosis information of the multiple actuators, and the diagnosis information of the multiple modular software functions; and a driver-assistance strategy of the target vehicle is determined according to the failure condition of the driver-assistance function of the target vehicle, and the target vehicle is continued to be assisted in driving according to the driver-assistance strategy.

Of course, an embodiment of the present application provides a storage medium including a computer-executable instruction, and the computer-executable instruction is not limited to the method operation described above, but may also perform related operations in the driver-assistance method provided in any of the embodiments of the present application.

Those skilled in the art will appreciate from the above description of the implementation manners that the present application may be implemented by means of software and general purpose hardware, and of course may also be implemented by hardware. Based on this understanding, the technical scheme of the present application may be embodied in the form of a software product, and the computer software product may be stored in a computer-readable storage medium, such as a floppy disk of a computer, a read-only memory (ROM), a random access memory (RAM), a flash memory (FLASH), a hard disk or an optional disk, and include multiple instructions to enable a vehicular device (which may be a personal computer, a server, or a network device, and the like) to perform the method described in the embodiments of the present application.

It is worth noting that in the above embodiments of the driver-assistance apparatus, the multiple units and modules included in the driver-assistance apparatus are only divided according to the function logic and are not limited to the above division, as long as the corresponding functions may be achieved; in addition, the name of each function unit is also merely to facilitate distinguishing from each other and is not intended to limit the scope of protection of the present application.

What is claimed is:

1. A driver-assistance method, comprising:

acquiring, in real time, diagnosis information of a plurality of sensors of a target vehicle, diagnosis information of a plurality of actuators of the target vehicle, and diagnosis information of a plurality of modular software functions;

determining a failure condition of a driver-assistance function of the target vehicle according to the diagnosis information of the plurality of sensors, the diagnosis information of the plurality of actuators, and the diagnosis information of the plurality of modular software functions; and determining a driver-assistance strategy of the target vehicle according to the failure condition of the driver-assistance function of the target vehicle, and continuing to assist in driving the target vehicle according to the driver-assistance strategy;

wherein determining the failure condition of the driver-assistance function of the target vehicle according to the diagnosis information of the plurality of sensors, the diagnosis information of the plurality of actuators, and the diagnosis information of the plurality of modular software functions comprises one of:

in a case where diagnosis information of at least one sensor among the plurality of sensors indicates an abnormality, and the diagnosis information of the plurality of modular software functions indicates a normality, determining a failure condition of a driver-assistance function corresponding to a target function link according to role information of the at least one sensor in the target function link;

in a case where diagnosis information of at least one actuator among the plurality of actuators indicates an abnormality, and the diagnosis information of the plurality of modular software functions indicates a normality, determining a failure condition of a driver-assistance function corresponding to a target function link according to role information of the at least one actuator in the target function link; or in a case where diagnosis information of at least one sensor among the plurality of sensors and diagnosis information of at least one actuator among the plurality of actuators indicate an abnormality, and the diagnosis information of the plurality of modular software functions indicates a normality, determining a failure condition of a driver-assistance function corresponding to a target function link according to role information of the at least one sensor and the at least one actuator in the target function link; and wherein determining the failure condition of the driver-assistance function corresponding to the target function link according to the role information of the at least one sensor in the target function link comprises:

in a case where the at least one sensor comprises one sensor which is connected to the target function link in series, determining that the driver-assistance function corresponding to the target function link fails;

wherein determining the failure condition of the driver-assistance function corresponding to the target function link according to the role information of the at least one actuator in the target function link comprises:

in a case where the at least one actuator comprises one actuator which is connected to the target function link in series, determining that the driver-assistance function corresponding to the target function link fails;

wherein determining the failure condition of the driver-assistance function corresponding to the target function link according to the role information of the at least one sensor and the at least one actuator in the target function link comprises:

in a case where the at least one sensor comprises one sensor which is connected to the target function link in series and the at least one actuator comprises one actuator which is connected to the target function link in series, determining that the driver-assistance function corresponding to the target function link fails.

2. The method of claim 1, wherein determining the failure condition of the driver-assistance function corresponding to the target function link according to the role information of the at least one sensor in the target function link comprises:

in a case where the at least one sensor is connected to the target function link in parallel, determining that the driver-assistance function corresponding to the target function link is valid; and determining a fault level of a valid driver-assistance function corresponding to the target function link according to weight information of the at least one sensor in the target function link;

wherein determining the failure condition of the driver-assistance function corresponding to the target function link according to the role information of the at least one actuator in the target function link comprises:

in a case where the at least one actuator is connected to the target function link in parallel, determining that the driver-assistance function corresponding to the target function link is valid; and determining a fault level of a valid driver-assistance function corresponding to the target function link according to weight information of the at least one actuator in the target function link;

wherein determining the failure condition of the driver-assistance function corresponding to the target function link according to the role information of the at least one sensor and the at least one actuator in the target function link comprises:

in a case where the at least one sensor and the at least one actuator is connected to the target function link in parallel, determining that the driver-assistance function corresponding to the target function link is valid; and determining a fault level of a valid driver-assistance function corresponding to the target function link according to weight information of the at least one sensor and the at least one actuator in the target function link.

3. The method of claim 1, wherein the target function link comprises at least one of: a lateral control function link, a longitudinal control function link, or a lane change control function link.

4. The method of claim 3, wherein the lateral control function link comprises a primary camera device, a secondary camera device, a display device, and a steering device;

the longitudinal control function link comprises a primary camera device, a secondary camera device, a front radar device, a display device, a power device and a brake device; and the lane change control function link comprises a left front corner radar device, a left rear corner radar device, a right front corner radar device, and a right rear corner radar device.

5. The method of claim 1, wherein determining the failure condition of the driver-assistance function of the target vehicle according to the diagnosis information of the plurality of sensors, the diagnosis information of the plurality of actuators, and the diagnosis information of the plurality of modular software functions comprises:

in a case where diagnosis information of at least one module software function among the plurality of modular software functions indicates an abnormality, determining that a driver-assistance function corresponding to the at least one module software function fails.

6. The method of claim 1, in a case where the diagnosis information of the plurality of sensors of the target vehicle, the diagnosis information of the plurality of actuators of the target vehicle, and the diagnosis information of the plurality of modular software functions are acquired in real time, the method further comprises:

receiving diagnosis information of a main line system sent by an auxiliary line system in real time, wherein the main line system and the auxiliary line system are distributed in different chips or different cores;

wherein determining the failure condition of the driver-assistance function of the target vehicle according to the diagnosis information of the plurality of sensors, the diagnosis information of the plurality of actuators, and the diagnosis information of the plurality of modular software functions comprises:

in a case where the diagnosis information of the main line system indicates a normality or part of the diagnosis information indicates an abnormality, determining the failure condition of the driver-assistance function of the target vehicle according to the diagnosis information of the plurality of sensors, the diagnosis information of the plurality of actuators, and the diagnosis information of the plurality of modular software functions.

7. The method of claim 6, further comprising:

performing a fault diagnosis on the auxiliary line system in real time, and sending auxiliary line diagnosis information to the auxiliary line system; and in a case where the auxiliary line diagnosis information indicates an abnormality, determining that backup of the driver-assistance function of the target vehicle fails.

8. The method of claim 1, wherein determining the driver-assistance strategy of the target vehicle according to the failure condition of the driver-assistance function of the target vehicle comprises:

querying a preset driver-assistance degradation strategy mapping table according to the failure condition of the driver-assistance function of the target vehicle to determine a driver-assistance degradation level matched with the failure condition of the driver-assistance function; and querying the driver-assistance degradation strategy mapping table according to the driver-assistance degradation level to determine a driver-assistance strategy matched with the driver-assistance degradation level.

9. A vehicular device, comprising:

at least one processor; and a memory, which is configured to store at least one program, wherein the at least one program, when executed by the at least one processor, causes the at least one processor to implement a driver-assistance method, wherein the driver-assistance method comprises:

acquiring, in real time, diagnosis information of a plurality of sensors of a target vehicle, diagnosis information of a plurality of actuators of the target vehicle, and diagnosis information of a plurality of modular software functions;

determining a failure condition of a driver-assistance function of the target vehicle according to the diagnosis information of the plurality of sensors, the diagnosis information of the plurality of actuators, and the diagnosis information of the plurality of modular software functions; and determining a driver-assistance strategy of the target vehicle according to the failure condition of the driver-assistance function of the target vehicle, and continuing to assist in driving the target vehicle according to the driver-assistance strategy;

wherein determining the failure condition of the driver-assistance function of the target vehicle according to the diagnosis information of the plurality of sensors, the diagnosis information of the plurality of actuators, and the diagnosis information of the plurality of modular software functions comprises one of:

in a case where diagnosis information of at least one sensor among the plurality of sensors indicates an abnormality, and the diagnosis information of the plurality of modular software functions indicates a normality, determining a failure condition of a driver-assistance function corresponding to a target function link according to role information of the at least one sensor in the target function link;

in a case where diagnosis information of at least one actuator among the plurality of actuators indicates an abnormality, and the diagnosis information of the plurality of modular software functions indicates a normality, determining a failure condition of a driver-assistance function corresponding to a target function link according to role information of the at least one actuator in the target function link; or in a case where diagnosis information of at least one sensor among the plurality of sensors and diagnosis information of at least one actuator among the plurality of actuators indicate an abnormality, and the diagnosis information of the plurality of modular software functions indicates a normality, determining a failure condition of a driver-assistance function corresponding to a target function link according to role information of the at least one sensor and the at least one actuator in the target function link; and wherein determining the failure condition of the driver-assistance function corresponding to the target function link according to the role information of the at least one sensor in the target function link comprises:

in a case where the at least one sensor comprises one sensor which is connected to the target function link in series, determining that the driver-assistance function corresponding to the target function link fails;

wherein determining the failure condition of the driver-assistance function corresponding to the target function link according to the role information of the at least one actuator in the target function link comprises:

in a case where the at least one actuator comprises one actuator which is connected to the target function link in series, determining that the driver-assistance function corresponding to the target function link fails;

wherein determining the failure condition of the driver-assistance function corresponding to the target function link according to the role information of the at least one sensor and the at least one actuator in the target function link comprises:

in a case where the at least one sensor comprises one sensor which is connected to the target function link in series and the at least one actuator comprises one actuator which is connected to the target function link in series, determining that the driver-assistance function corresponding to the target function link fails.

10. A non-transitory computer-readable storage medium, storing a computer program, wherein the program, when executed by a processor, implements a driver-assistance method, wherein the driver-assistance method comprises:

acquiring, in real time, diagnosis information of a plurality of sensors of a target vehicle, diagnosis information of a plurality of actuators of the target vehicle, and diagnosis information of a plurality of modular software functions;

determining a failure condition of a driver-assistance function of the target vehicle according to the diagnosis information of the plurality of sensors, the diagnosis information of the plurality of actuators, and the diagnosis information of the plurality of modular software functions; and determining a driver-assistance strategy of the target vehicle according to the failure condition of the driver-assistance function of the target vehicle, and continuing to assist in driving the target vehicle according to the driver-assistance strategy;

wherein determining the failure condition of the driver-assistance function of the target vehicle according to the diagnosis information of the plurality of sensors, the diagnosis information of the plurality of actuators, and the diagnosis information of the plurality of modular software functions comprises one of:

in a case where diagnosis information of at least one sensor among the plurality of sensors indicates an abnormality, and the diagnosis information of the plurality of modular software functions indicates a normality, determining a failure condition of a driver-assistance function corresponding to a target function link according to role information of the at least one sensor in the target function link;

in a case where diagnosis information of at least one actuator among the plurality of actuators indicates an abnormality, and the diagnosis information of the plurality of modular software functions indicates a normality, determining a failure condition of a driver-assistance function corresponding to a target function link according to role information of the at least one actuator in the target function link; or in a case where diagnosis information of at least one sensor among the plurality of sensors and diagnosis information of at least one actuator among the plurality of actuators indicate an abnormality, and the diagnosis information of the plurality of modular software functions indicates a normality, determining a failure condition of a driver-assistance function corresponding to a target function link according to role information of the at least one sensor and the at least one actuator in the target function link; and wherein determining the failure condition of the driver-assistance function corresponding to the target function link according to the role information of the at least one sensor in the target function link comprises:

in a case where the at least one sensor comprises one sensor which is connected to the target function link in series, determining that the driver-assistance function corresponding to the target function link fails;

wherein determining the failure condition of the driver-assistance function corresponding to the target function link according to the role information of the at least one actuator in the target function link comprises:

in a case where the at least one actuator comprises one actuator which is connected to the target function link in series, determining that the driver-assistance function corresponding to the target function link fails;

wherein determining the failure condition of the driver-assistance function corresponding to the target function link according to the role information of the at least one sensor and the at least one actuator in the target function link comprises:

in a case where the at least one sensor comprises one sensor which is connected to the target function link in series and the at least one actuator comprises one actuator which is connected to the target function link in series, determining that the driver-assistance function corresponding to the target function link fails.

11. The method of claim 2, wherein the target function link comprises at least one of: a lateral control function link, a longitudinal control function link, or a lane change control function link.

12. The method of claim 1, wherein determining the failure condition of the driver-assistance function of the target vehicle according to the diagnosis information of the plurality of sensors, the diagnosis information of the plurality of actuators, and the diagnosis information of the plurality of modular software functions comprises:

in a case where diagnosis information of at least one module software function among the plurality of modular software functions indicates an abnormality, determining that a driver-assistance function corresponding to the at least one module software function fails.

13. The vehicular device of claim 9, wherein determining the failure condition of the driver-assistance function corresponding to the target function link according to the role information of the at least one sensor in the target function link comprises:

in a case where the at least one sensor is connected to the target function link in parallel, determining that the driver-assistance function corresponding to the target function link is valid; and determining a fault level of a valid driver-assistance function corresponding to the target function link according to weight information of the at least one sensor in the target function link;

wherein determining the failure condition of the driver-assistance function corresponding to the target function link according to the role information of the at least one actuator in the target function link comprises:

in a case where the at least one actuator is connected to the target function link in parallel, determining that the driver-assistance function corresponding to the target function link is valid; and determining a fault level of a valid driver-assistance function corresponding to the target function link according to weight information of the at least one actuator in the target function link;

wherein determining the failure condition of the driver-assistance function corresponding to the target function link according to the role information of the at least one sensor and the at least one actuator in the target function link comprises:

in a case where the at least one sensor and the at least one actuator is connected to the target function link in parallel, determining that the driver-assistance function corresponding to the target function link is valid; and determining a fault level of a valid driver-assistance function corresponding to the target function link according to weight information of the at least one sensor and the at least one actuator in the target function link.

14. The vehicular device of claim 9, wherein the target function link comprises at least one of: a lateral control function link, a longitudinal control function link, or a lane change control function link.

15. The vehicular device of claim 14, wherein the lateral control function link comprises a primary camera device, a secondary camera device, a display device, and a steering device;

the longitudinal control function link comprises a primary camera device, a secondary camera device, a front radar device, a display device, a power device and a brake device; and the lane change control function link comprises a left front corner radar device, a left rear corner radar device, a right front corner radar device, and a right rear corner radar device.

16. The vehicular device of claim 9, wherein determining the failure condition of the driver-assistance function of the target vehicle according to the diagnosis information of the plurality of sensors, the diagnosis information of the plurality of actuators, and the diagnosis information of the plurality of modular software functions comprises:

in a case where diagnosis information of at least one module software function among the plurality of modular software functions indicates an abnormality, determining that a driver-assistance function corresponding to the at least one module software function fails.

* * * * *